2,944,933

THIOPHOSPHORIC ACID ESTER

Richard Sallmann, Binningen, Switzerland, assignor to Ciba Limited, Basel, Switzerland, a Swiss firm No Drawing. Filed June 12, 1959, Ser. No. 819,813

Claims priority, application Switzerland Aug. 8, 1958

2 Claims. (Cl. 167—22)

This invention provides the new thiophosphoric acid ester of the formula

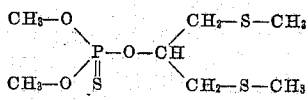

The invention also provides a process for the manufacture of the above compound wherein (a) a compound of the formula

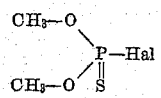

is reacted with a compound of the formula

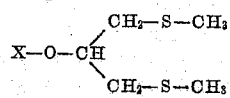

or (b) a compound of the formula

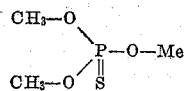

is reacted with a compound of the formula

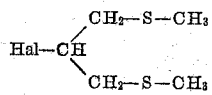

in which formulae Hal represents a halogen atom, X represents a hydrogen atom or a metal atom, and Me represents a metal atom, or (c) a compound of the formula

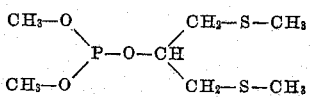

is additively combined with sulfur.

The above method (a) is preferred. In this case, when the free dithioglycerine dimethyl ether is used, instead of the metal alcoholate, the reaction is carried out in the presence of a condensing agent, for example, pyridine or potassium carbonate and copper powder.

The reaction is advantageously carried out at room temperature or a moderately raised temperature and in an inert diluent. As a diluent there may be used, for example, a hydrocarbon, such as benzene, toluene or the like, or chlorobenzene or the like, or a ketone such as acetone, methyl ethyl ketone or methyl propyl ketone.

The new thiophosphoric acid ester is an active contact poison especially against insects and acarides, in the various stages of development, such as eggs, larvae or imagines. In the case of pest-infested plants they also exhibit an inner therapeutic, so-called systemic, action. They surprisingly possess an extremely low toxicity towards warm blooded animals. Thus, the toxicity $LD_{50}$ in the case of mice is 220 milligrams administered per os per kilogram of body weight and the toxicity $LD_{100}$ in the case of mice is 350 milligrams per os per kilogram of body weight. As compared with this thiophosphoric acid ester of the formula $(C_2H_5O)PS(OC_2H_4SC_2H_5)$, which is described in U.S. Patent No. 2,571,989, granted October 16, 1951, to Gerhard Schrader, as an insecticide having an inner therapeutic action, the toxicity $LD_{100}$ in the case of mice is 30–40 milligrams administered per os per kilogram of body weight.

The present invention also includes preparations for combating pests, which contain the thiophosphoric acid ester of this invention as an active substance.

A very wide variety of substances can be protected against pests with the compounds of this invention and gaseous or liquid or solid substances can be used as carriers for the active substance. As such substances to be protected or to be used as carriers there may be mentioned, for example, air, especially in rooms, and liquids, for example, water in ponds, and any dead or living solid substrata, for example, any articles in living rooms, in cellars, plaster floors, stables, and also pelts, feathers, wool and the like, and also living organisms of the vegetable and animal kingdoms, such as ornamental or useful plants, forest stock, domestic animals, herds of cattle etc., in their various states of development, insofar as they are insensitive to the active substance of this invention.

The active substance of this invention may be used for combating pests by the usual methods, for example, by treating the object or material to be protected with the compound in the form of vapour, for example, as a fumigating preparation or in the form of a dusting powder or spraying preparation, for example, in the form of a solution or suspension, prepared with water or a suitable organic solvent, for example, alcohol, petroleum, a tar distillate or the like. There may also be used aqueous solutions or aqueous emulsions of organic solvents, which contain the active substance for brushing, spraying or dipping the objects to be protected.

Spraying preparations or dusting powders may contain the usual inert fillers or identification substances, for example, kaolin, gypsum or bentonite, or other additions such as sulfite cellulose waste liquor, cellulose derivatives or the like. For improving their wetting capacity or adhesion the preparations may contain the usual wetting agents or adherent agents. The preparations may be prepared in powdered form, in the form of aqueous dispersions or pastes or as self-dispersing oils.

The new thiophosphoric acid ester may be used as the sole active substance in a preparation for combating pests or it may be present in conjunction with another insecticide and/or fungicide. Such preparations can be used for the protection of plants by the usual spraying, watering, dusting or fumigating methods.

The following examples illustrate the invention, the parts being by weight unless otherwise stated, and the relationship of parts by weight to parts by volume being the same as that of the kilogram to the liter:

*Example 1*

76.0 parts of 1:3-dithioglycerine dimethyl ether boiling at 125–26° C. under 13 mm. pressure are slowly added to a suspension of 11.5 parts of finely divided sodium in 500 parts by volume of at 15–20° C. toluene. When the addition is complete, the whole is stirred for a further hour at 40° C. The sodium is present as a clear pale yellow solution. At 15–20° C. there are slowly added, while stirring, 80.0 parts of dimethyl-thio-phosphoryl chloride. In order to complete the reaction the whole is stirred for 3 hours at 60° C. After being cooled, the solution, which contains the sodium chloride in finely dispersed form, is washed twice with 150 parts of water on each occasion. By drying the solution with sodium sulfate and distilling off the toluene there are obtained 120 parts of a pale yellow oil which cannot be distilled. The resulting thiophosphoric acid ester of the formula

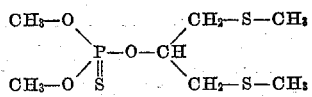

is insoluble in water and soluble in the usual organic solvents.

Analysis: S calculated=34.80%, found=34.72%.

Example 2

2 parts of the thiophosphoric acid ester obtained as described in Example 1 are mixed with 1 part of the condensation product of 1 mol of tertiary octyl-phenol with 8 mols of ethylene oxide and 7 parts of isopropanol. A clear solution is obtained which can be used as a concentrate for preparing spray liquors and can be emulsified by pouring it into water.

A. In order to demonstrate the inner therapeutic, so-called systemic, action of the product the following test was carried out with the use of spraying liquors having contents of 0.08% and 0.04% of active substance.

In the case of broad beans (*Vicia fabae*), which were heavily infested with aphids (*Doralis fabae*), the lower leaves were removed and a colored mark was made halfway up the stalk. The lower halves of the stalks of two plants were sprayed with one of the aforesaid praying liquors and the lower halves of the stalks of two other plants were sprayed with the other spraying liquor. After 48 hours the control of the action of the aphids in the upper, non-sprayed part of the plants was observed. The following results were obtained:

| Concentration of spray liquor | Action on aphids after 48 hours |
| --- | --- |
| 0.08% | ++ |
| 0.04% | ++ |

For each plant a mark is used. + means that no living aphids are present, indicating a good action, | only a few living aphids, and — indicates an insufficient action or no action.

B. In order to demonstrate the contact action on aphids the following test was carried out with the use of spray liquors having concentrations of 0.08%, 0.04%, 0.02% and 0.01% of active substance.

Broad beans, that were heavily infested with aphids, were sprayed on all sides and after 48 hours the effect was observed. In the case of a 10% action, the plants were infected with fresh aphids and the action was observed after a further 48 hours. The results are given in the following table:

| Concentration of spray liquor | Action on aphids | |
| --- | --- | --- |
| | After 48 hours | 48 hours after reinfection |
| 0.08% | ++ | ++ |
| 0.04% | ++ | || |
| 0.02% | ++ | — |
| 0.01% | ++ | — |

C. In order to establish the action on aphids by diffusion through the leaves the following test was carried out with spray liquors having concentrations of 0.8%, 0.04%, 0.02% and 0.01% of active substance:

Only the upper surfaces of the leaves of broad beans, that were infested with aphids only on the lower surfaces of the leaves, were sprayed with the above spray liquors, and the results of the action on the lower surfaces of the leaves after 48 hours were observed. The results obtained are given in the following table:

| Concentration of spray liquor | Action on aphids |
| --- | --- |
| 0.08% | +++ |
| 0.04% | ++ |
| 0.02% | || |
| 0.01% | ||| |

For preparing spray concentrates other wetting and emulsifying agents than those mentioned above may be used. There may be used non-ionic products, for example, condensation products of aliphatic alcohols, amines or carboxylic acids having a hydrocarbon residue containing a chain of about 10–30 carbon atoms with ethylene oxide, such as the condensation product of octadecyl alcohol with 25–30 mols of ethylene oxide or the condensation product of soya bean fatty acid with 30 mols of ethylene oxide or of commercial oleylamine with 15 mols of ethylene oxide or of dodecylmercaptan with 12 mols of ethylene oxide.

Among the anion-active emulsifying agents, which may be used in this connection, there may be mentioned the sodium salt of dodecylsulfuric acid ester, the sodium salt of dodecyl-benzene sulfonic acid, the potassium or triethanolamine salt of oleic acid or abietic acid or of mixtures of these acids, or the sodium salt of a petroleum sulfonic acid.

Instead of isopropanol, another solvent may be used for preparing spray concentrates, for example, ethyl alcohol, methanol, butanol, acetone, methyl ethyl ketone, methyl-cyclohexanol, benzene, toluene, xylene, kerosenes or petroleum fractions. It will, of course, be understood that mixtures of different solvents may be used.

Example 3

1 part of the product obtained as described in Example 1 is mixed with 99 parts of talc. The resulting mixture is an insecticidal dusting powder suitable for dusting vines. The whole or a part of the talc may be replaced by sulfur, in which case the preparation is also active against Oidium. Instead of talc, another pulverulent carrier may be used, such as chalk, bentonite, kaolin or a mixture of these materials.

Example 4

By using a spray liquor containing, per liter, 1 gram of zinc dimethyl-dithiocarbamate and 1 gram of the compound obtained as described in Example 1, for spraying fruit trees in the summer, a good control of aphids and scab (Fusicladium) was achieved.

Example 5

Hop plants are coated with a liquor containing 0.04% of the compound obtained as described in Example 1. After a short time all the hop plants were free from aphids and red spiders (Tetranychidae).

What is claimed is:

1. The thiophosphoric acid ester of the formula

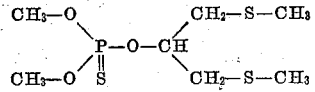

2. An insecticidal and acaricidal preparation which contains as the active ingredient the thiophosphoric acid ester of the formula

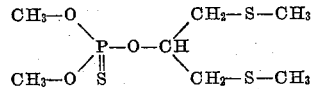

References Cited in the file of this patent

UNITED STATES PATENTS 2,777,792    Lutz et al.               Jan. 15, 1957

FOREIGN PATENTS 767,950    Great Britain           Feb. 13, 1957
311,466    Switzerland            Jan. 31, 1956